US008792300B2

(12) United States Patent
Sallas

(10) Patent No.: US 8,792,300 B2
(45) Date of Patent: Jul. 29, 2014

(54) LOW-FREQUENCY CONTENT BOOST FOR VIBRATORY SEISMIC SOURCE AND METHOD

(75) Inventor: John J. Sallas, Plano, TX (US)

(73) Assignee: CGGVeritas Services SA, Massy Cedex (FR)

(*) Notice: Subject to any disclaimer, the term of this patent is extended or adjusted under 35 U.S.C. 154(b) by 391 days.

(21) Appl. No.: 13/335,093

(22) Filed: Dec. 22, 2011

(65) Prior Publication Data
US 2013/0163380 A1   Jun. 27, 2013

(51) Int. Cl.
*G01V 1/00* (2006.01)
*G01V 1/155* (2006.01)
*B05C 11/02* (2006.01)

(52) U.S. Cl.
USPC ............ 367/41; 367/189; 118/113; 118/114

(58) Field of Classification Search
USPC .................. 367/41, 189; 118/113, 114
See application file for complete search history.

(56) References Cited

U.S. PATENT DOCUMENTS

| | | | |
|---|---|---|---|
| 4,114,722 A * | 9/1978 | Weber et al. ................. | 181/114 |
| 4,184,144 A * | 1/1980 | Rickenbacker .............. | 367/137 |
| 4,567,583 A * | 1/1986 | Landrum, Jr. ............... | 367/190 |
| 4,654,836 A * | 3/1987 | Wason ......................... | 367/190 |
| 5,774,418 A * | 6/1998 | Magendie et al. ........... | 367/25 |
| 7,327,633 B2 | 2/2008 | Bagaini et al. | |
| 7,859,945 B2 | 12/2010 | Sallas et al. | |
| 2005/0267695 A1* | 12/2005 | German ........................ | 702/41 |
| 2007/0133354 A1* | 6/2007 | Bagaini et al. .............. | 367/189 |
| 2008/0173104 A1* | 7/2008 | German ................... | 73/862.381 |
| 2010/0199772 A1* | 8/2010 | Bagaini ......................... | 73/648 |
| 2010/0232260 A1* | 9/2010 | Zowarka et al. ............ | 367/189 |
| 2011/0205842 A1* | 8/2011 | Baeten ........................ | 367/37 |

\* cited by examiner

*Primary Examiner* — Luke Ratcliffe
*Assistant Examiner* — Hovhannes Baghdasaryan
(74) *Attorney, Agent, or Firm* — Patent Portfolio Builders PLLC

(57) ABSTRACT

Computer software, computer and method for generating with a computing device a desired pilot signal for driving a vibratory source to generate seismic waves. The method includes steps for compressing a pilot signal in a force domain and also compressing a mass displacement in a displacement domain. The resulting desired pilot signal boosts the low-frequency end of the vibratory source.

16 Claims, 17 Drawing Sheets

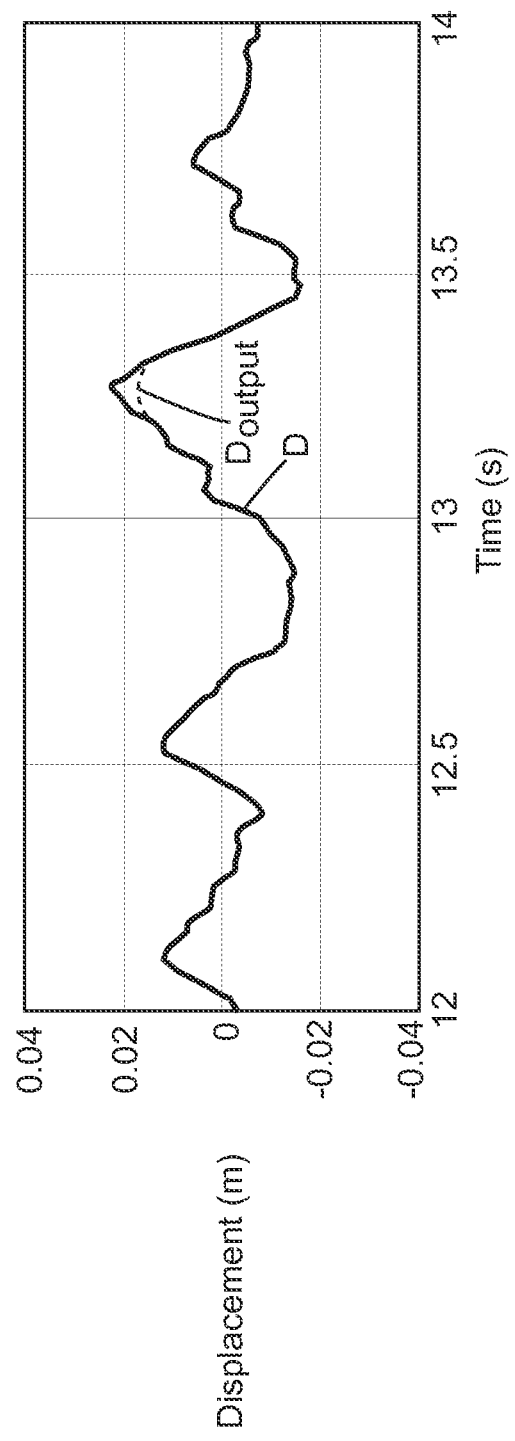

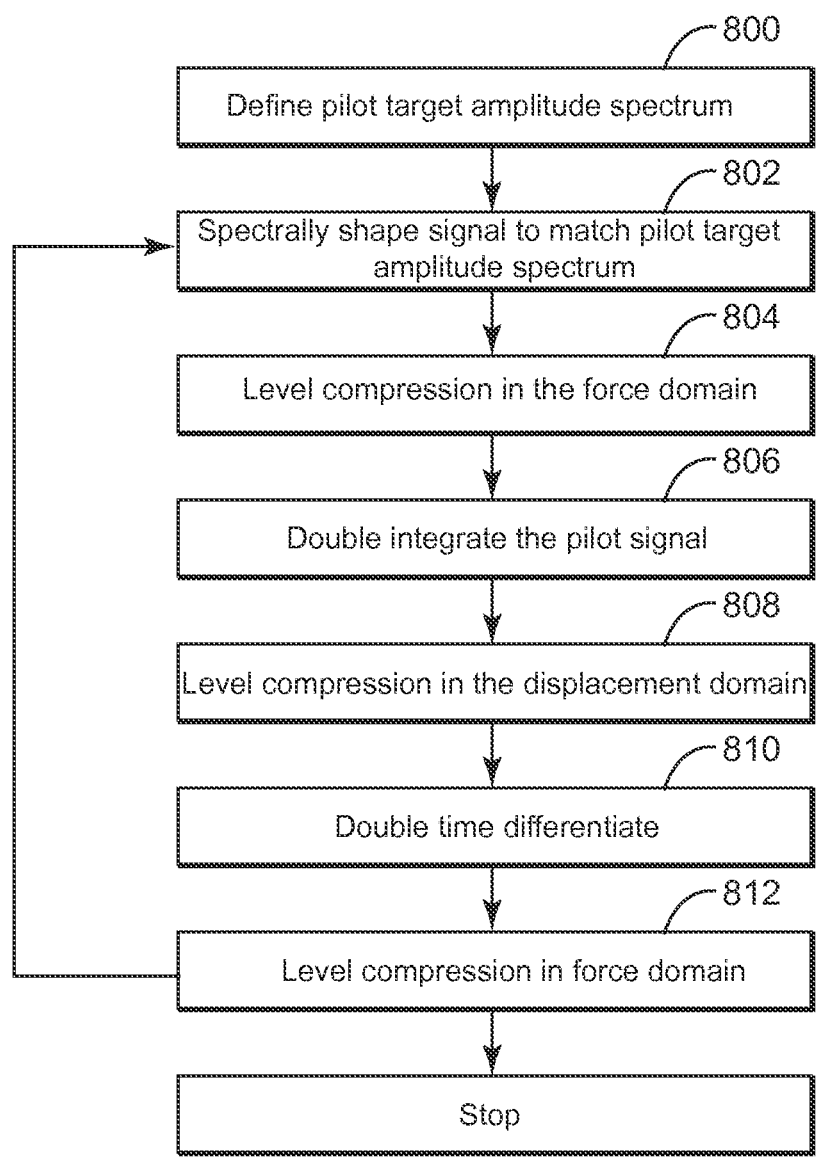

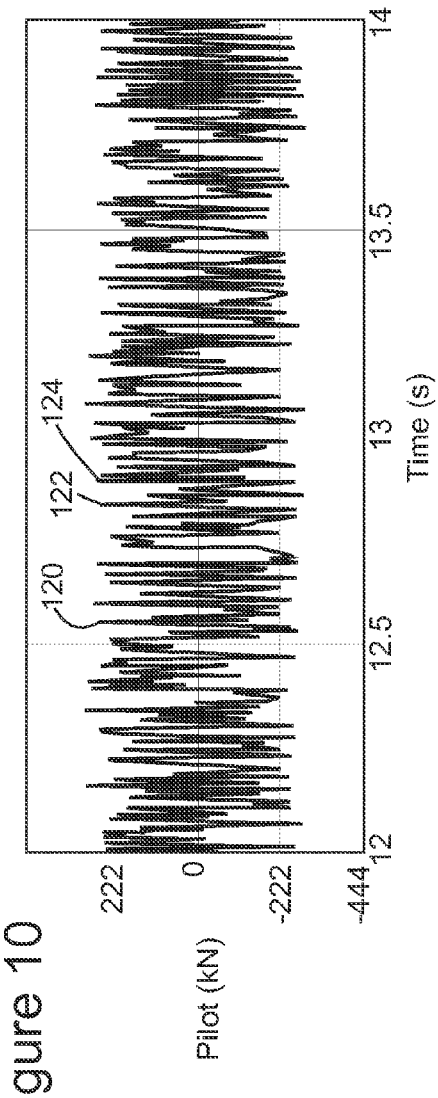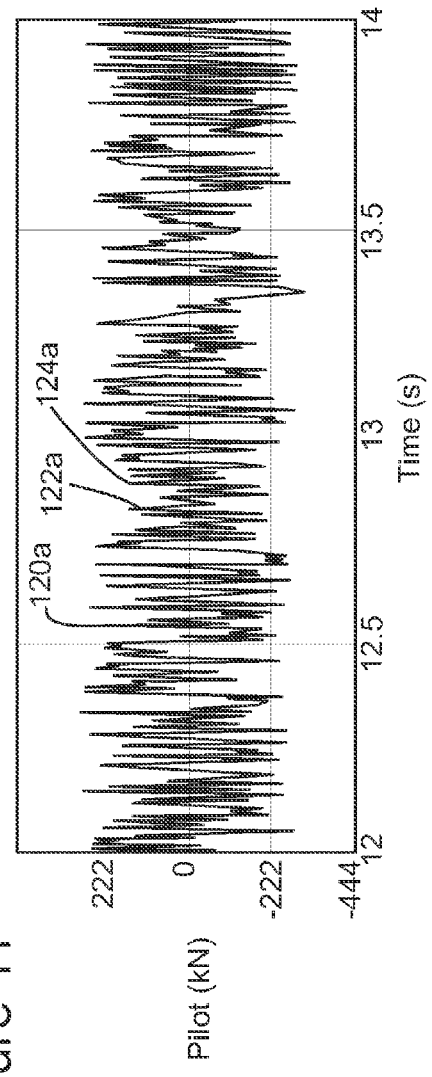

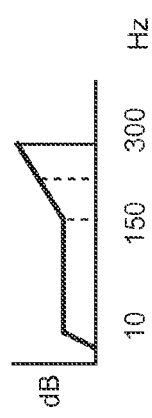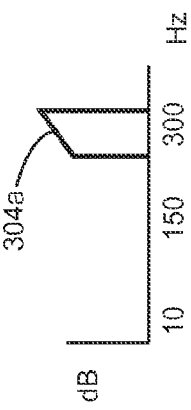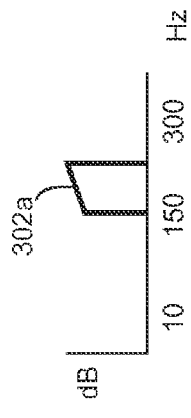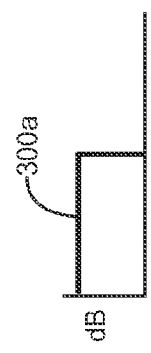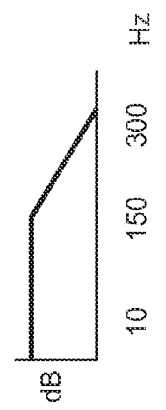
Figure 15A
Figure 15B
Figure 15C
Figure 15D
Figure 15E
Figure 15F

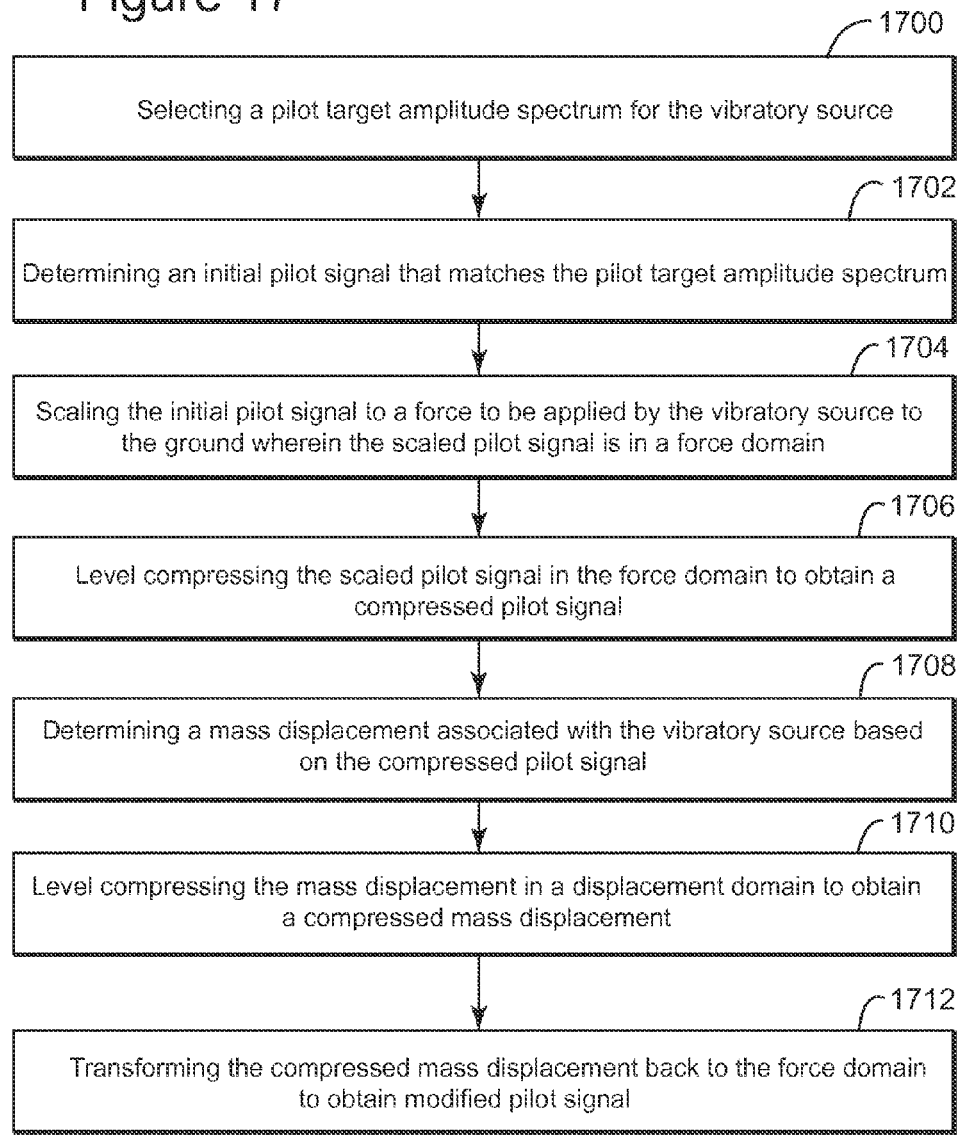

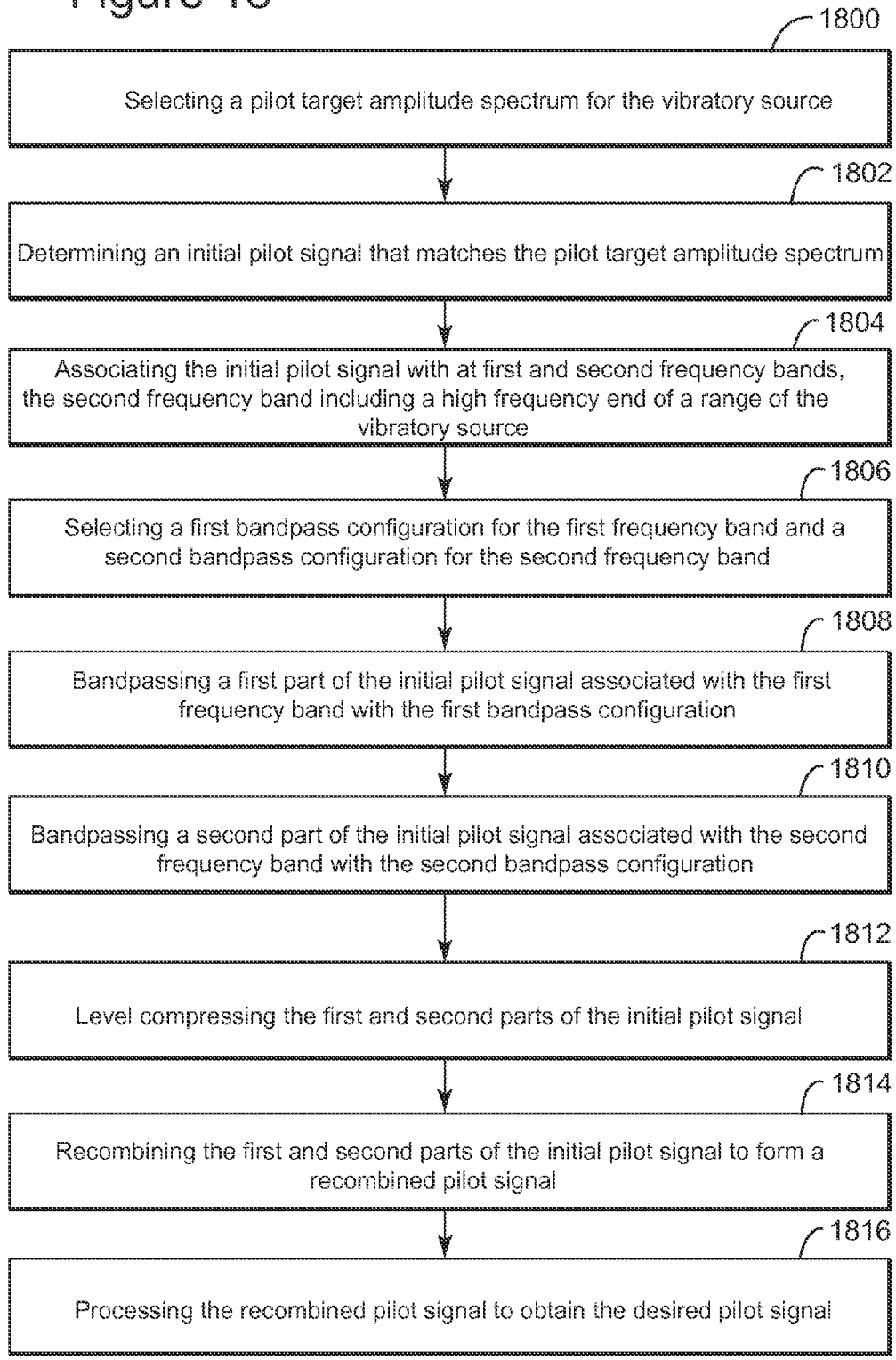

LOW-FREQUENCY CONTENT BOOST FOR VIBRATORY SEISMIC SOURCE AND METHOD

BACKGROUND

1. Technical Field

Embodiments of the subject matter disclosed herein generally relate to methods and systems and, more particularly, to mechanisms and techniques for boosting low- and/or high-frequency content for seismic sources.

2. Discussion of the Background

Reflection seismology is a method of geophysical exploration to image the subsurface of the earth for determining its properties, which information is especially helpful in the oil and gas industry. Typically a controlled source sends seismic energy waves into the earth. By measuring the time it takes for the reflections to come back to plural receivers, it is possible to estimate the depth and/or composition of the features causing such reflections. These features may be associated with subterranean hydrocarbon deposits.

For land applications, vibratory sources are commonly used. Vibratory sources, including hydraulically powered sources, electro-dynamic and sources employing piezoelectric or magnetostrictive material, can generate signals that include various frequency bands, commonly referred to as "frequency sweeps." In other words, the frequency band of such sources may be controlled.

Seismic vibrators in use today have constraints that impose frequency-variant limits on their output amplitude spectrum. Certain constraints have been recognized in the art. For instance, Bagaini et al. (U.S. Pat. No. 7,327,633, the entire disclosure of which is incorporated herein by reference), have recognized that mass displacement (or "stroke") of a seismic vibrator device imposes a constraint on the frequency content emitted by the vibratory source. However, while a given constraint, such as a mass displacement, of a seismic vibrator has been considered when designing a sweep for achieving a desired target output spectrum by the seismic vibrator, such consideration of a single constraint fails to take into account other constraints that may impose limitations on the sweep, and thus the resulting designed sweep may fail to operate properly when implemented on the seismic vibrator.

Thus, Sallas (patent application Ser. No. 12/576,804, herein '804, the entire content of which is incorporated herein by reference), explores and takes into account various constraints (not only the stroke limitation) that impose frequency-variant limits on the source output amplitude spectrum. These constraints include but are not limited to: reaction mass stroke, maximum deliverable pump flow, hold-down weight, servo-valve response, available supply pressure, and driven structure response. The problem is compounded by other effects like absorption of high frequency energy and environmental noise. While a conventional linear sweep may work well enough to image the subsurface given enough sweep time, it may not provide the most economical solution especially if it requires the use of very long sweep times or many shots at a particular location.

Thus, '804 disclosed a sweep generator that employs a procedure that creates a nonlinear swept sine wave sweep to build up the sweep spectral density to achieve a target spectrum (that is defined by the user to meet the geophysical survey objectives) in compliance with (i.e., without violating) various constraints of the seismic vibrator. '804 also considers other constraints such as environmental constraints (which may be defined by an operator or derived from prior data about a target location), and the disclosed sweep generator employs a procedure for determining a sweep (e.g., a nonlinear sweep) to achieve the target spectrum in compliance with those other constraints in addition to or instead of the constraint(s) of the seismic vibrator that are accounted for by the sweep generator.

For example, '804 discloses that when working near populated areas it may be desirable to reduce the instantaneous peak amplitude of the vibrator force through a certain range of frequencies so as not to excite some structural resonance. Likewise, the sweep generation techniques described in '804 may be implemented to compensate for a drop in instantaneous amplitude through a range of frequencies imposed by environmental constraints and a suitable nonlinear sweep may be generated to build up the sweep spectral density to achieve a target spectrum.

However, the aforementioned techniques for generating sweeps that compensate for system constraints that fall in the low- and high-frequency range are designed for use with swept sine wave excitation signals and are not well suited for use with pseudo-random excitation signals. Existing techniques that are designed for use with swept sine waves include compensation methods for the low-frequency end that avoid the possibility of driving the source to reach the stroke limitations, i.e., the reaction mass of the source may reach the stops. At the high-frequency end, especially if it is desired to mimic the spectrum of a non-linear sweep designed to overcome the high-frequency attenuation of the earth (absorption), the existing techniques reduce the risk of overdriving the servo-valve or even run into overpressure situations in the actuator that can lead to working fluid cavitation.

With interest in using unconventional sweeps to increase productivity through use of separable simultaneous sources, there is a need for a corresponding pilot sweep design method that is suitable for use with pseudo-random pilot sweeps that maximizes the energy in the sweep while still honoring the target spectrum without exceeding system constraints: that is, a pilot signal configured to drive a seismic vibratory source to avoid the stroke limitations at the low-frequency end and to not overdrive the servo-valve of the source at the high-frequency end and, at the same time, to boost the low- and high-frequency ends (content) as these parts of the spectrum are important for imaging the subsurface.

With swept sine wave sweeps the frequencies usually change monotonically and at any point in time there is only one frequency or a very narrowband range of frequencies in the pilot signal. Pseudo-random pilot sweeps impose special problems because at any point any time a plurality of frequencies is present simultaneously and their subsequent impact on system demand more difficult to predict. Furthermore, it is desirable for the output of the vibrator to follow the pilot signal, since typically the pilot signal is used as a correlation operator and assumed to be representative of the emitted energy. The drive level for the source radiated output is chosen so that the vibrator does not exceed some system limit within its sweep. Drive level is usually defined as a percentile of the holddown weight or the peak force output rating of the vibrator, where for example a drive level setting of 80% would imply that the peak force output of the truck is 80% of the static holddown force applied to the baseplate to keep it in contact with the earth. A reduction in the drive level setting will reduce the force output of the truck throughout the entire sweep time. Reduction in output is undesirable because it will reduce the signal to ambient noise ratio in the received signal.

If for some reason a pseudo-random pilot signal creates peak demands that exceed system limits at any time within the sweep interval, then the vibrator drive level setting will need to be reduced resulting in a reduction in the total emitted energy. So it is desired that the pseudo-random signal be designed to maximize its energy content without creating peak demands that lead to exceed system constraints so that drive level settings can be maximized. Accordingly, it would be desirable to provide systems and methods that overcome the afore-described problems and drawbacks.

SUMMARY

According to one exemplary embodiment, there is a method for generating with a computing device a desired pilot signal for driving a vibratory source to generate seismic waves. The method includes selecting a pilot target amplitude spectrum for the vibratory source; determining an initial pilot signal that matches the pilot target amplitude spectrum; scaling the initial pilot signal to a force to be applied by the vibratory source to the ground, wherein the scaled pilot signal is in a force domain; level compressing the scaled pilot signal in the force domain to obtain a compressed pilot signal; determining a mass displacement associated with the vibratory source based on the compressed pilot signal; level compressing the mass displacement in a displacement domain to obtain a compressed mass displacement; and transforming the compressed mass displacement back to the force domain to obtain a modified pilot signal. The level compressing of the mass displacement takes into account stroke limits of the vibratory source, and the modified pilot signal boosts a low-frequency end of the vibratory source comparative to the initial pilot signal.

According to another exemplary embodiment, there is a computer for generating a desired pilot signal suitable for driving a vibratory source to generate seismic waves. The computer includes an interface configured to receive a pilot target amplitude spectrum for the vibratory source; and a processor connected to the interface. The processor is configured to determine an initial pilot signal that matches the pilot target amplitude spectrum, scale the pilot signal to a force to be applied by the vibratory source to ground, wherein the scaled pilot signal is in a force domain, level compress the scaled pilot signal in the force domain to obtain a compressed pilot signal, determine a mass displacement associated with the vibratory source based on the compressed pilot signal, level compress the mass displacement in a displacement domain to obtain a compressed mass displacement, and transform the compressed mass displacement back to the force domain to obtain a modified pilot signal. The level compressing of the mass displacement takes into account stroke limits of the vibratory source, and the modified pilot signal boosts a low-frequency end of the vibratory source comparative to the initial pilot signal.

According to still another exemplary embodiment, there is a computer readable medium including computer executable instructions, wherein the instructions, when executed by a processor, implement the method discussed above.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 7 is a graph illustrating the output of a compression function and a displacement of a reaction mass of a vibratory source versus time according to an exemplary embodiment;

FIG. 8 if a flowchart illustrating a method for boosting the low-frequency content for a vibratory source according to an exemplary embodiment;

FIG. 10 illustrates a pilot signal in a force domain according to an exemplary embodiment;

FIG. 11 illustrates an effect of a displacement domain compression on a pilot signal in the force domain;

FIGS. 15A-F show various spectrum shapes for a vibratory source and a pilot signal for driving the same according to an exemplary embodiment;

FIG. 17 is a flowchart of a method for increasing a low-frequency content of a vibratory source according to an exemplary embodiment;

FIG. 18 is a flowchart of a method for increasing a high-frequency content of a vibratory source according to an exemplary embodiment;

DETAILED DESCRIPTION

Figure 1:
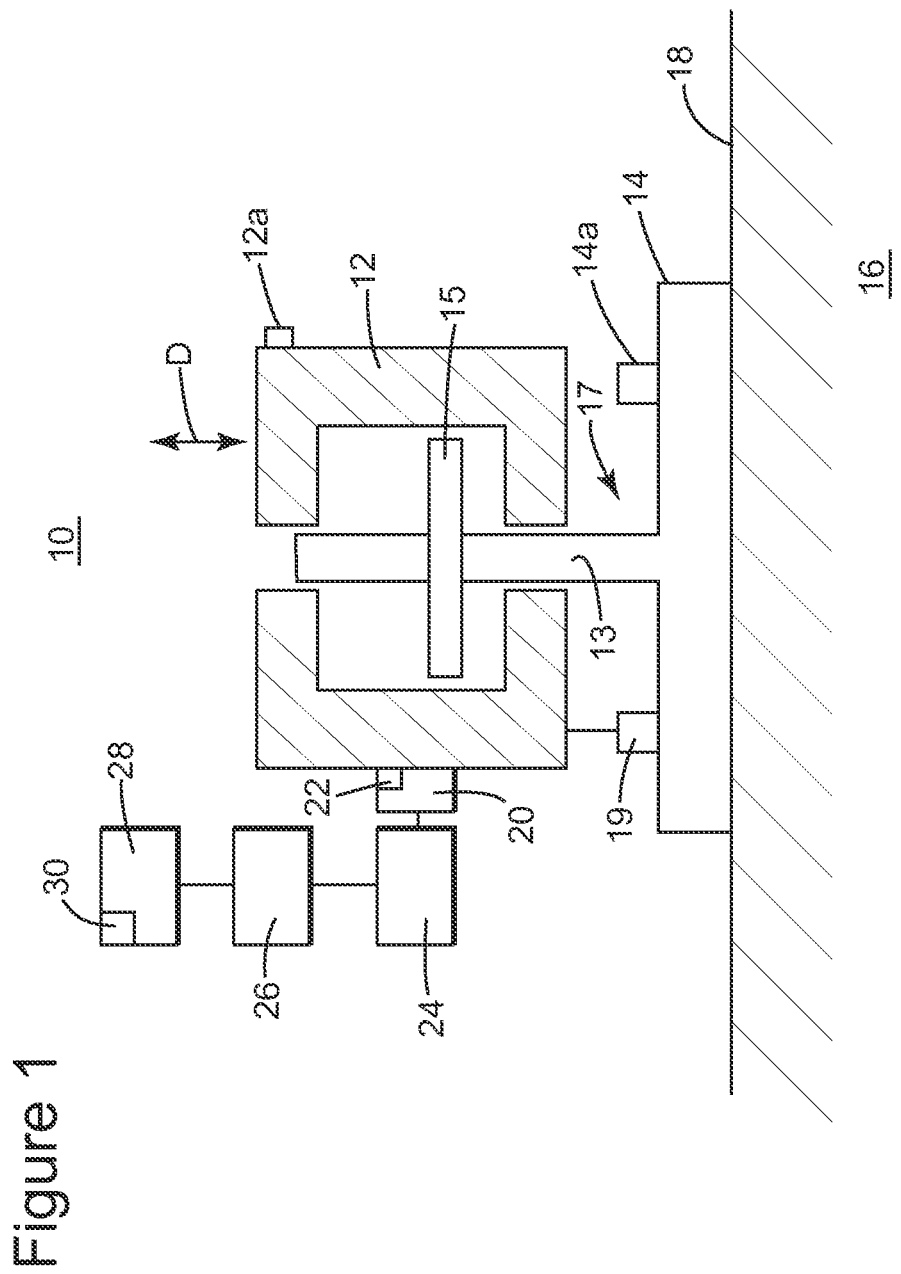
FIG. 1 is a schematic diagram of a vibratory source according to an exemplary embodiment.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a vibratory source being driven by pseudo-random reference signals. However, the embodiments to be discussed next are not limited to plural pseudo-random reference signals but may be applied to a single pilot signal.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

In the following, a method for boosting the low-frequency content of the vibratory source is discussed first and a method for boosting the high-frequency content of the source is discussed second. In one exemplary embodiment, the low-frequency boost method may be applied independent of the high-frequency boost method. However, in one application, both methods are applied at the same time.

As discussed above, the low-frequency part of the spectrum for a vibratory source may be impacted by various characteristics of the source, e.g., the stroke limitation. A pilot signal may be designed as known in the art, see for example '804, to be used as an input signal for a controller of the vibrator. The controller is configured to adjust the drive signal so that the ground force of the vibrator (e.g., earth contact force) matches the pilot signal. An example of a pilot signal is a pseudo-random reference signal, as disclosed, for example, in U.S. Pat. No. 7,859,945 (herein '945, the entire content of which is incorporated herein by reference). Thus, a description of the pseudo-random reference signal is omitted herein. For simplicity, in the following, the pilot signal is assumed to include one or more pseudo-random reference signals. However, the novel features described in this application equally apply to other types of pilot signals, i.e., pilot signals that contain a mixture or plurality of frequencies at a point in time.

In general, pseudo-random signals have less energy than a swept sine wave of equal peak amplitude. Thus, it is desirable to apply some type of wave-shaping to the pilot signal to boost its output. '945 describes a wave-shaping process that is applied to the pilot signal in a force domain to increase the root mean square (RMS) content of the ground force. However, the exemplary embodiment to be discussed next applies a further wave-shaping to the pilot signal to allow the vibrator to be operated at a higher drive level setting without mass over travel thereby allowing the vibrator to shake harder thus boosting the output of the source overall and permitting operation to lower frequency. This further wave-shaping is applied in the displacement domain in the novel method and not in a force domain as in '945.

Considering a vibratory source 10 as shown in FIG. 1, it is noted that a flow drives a reaction mass 12 in one direction, thereby creating a reaction force that is transmitted on a baseplate 14 through a rod 13 for imparting energy to ground 16. Inside the bore of the reaction mass 12 is a double acting piston 15 that is attached through the rod 13 to the baseplate 14. The baseplate 14 sits on the ground surface 18. An accelerometer 12a may be located on the reaction mass 12 and an accelerometer 14a may be located on the baseplate 14. Elements 13, 14, and 15 along with any other elements (e.g., accelerometer 14a) that are rigidly attached to elements 13, 14, and 15 are referred to as the driven structure 17. FIG. 1 also shows a hydraulic system 20 that actuates the reaction mass 12. A servo-valve 22, typically comprised of a 4-way proportional spool valve that is driven by a small pilot valve, is part of the hydraulic system 20 and regulates an amount of hydraulic fluid that actuates the reaction mass 12 directing flow in and out of the interior upper and lower chambers of the reaction mass 12. The pilot valve converts the electrical drive signal produced by the vibrator controller into a hydraulic flow suitable for driving the main stage spool valve. A pump 24 is configured to pump the hydraulic fluid in the hydraulic system 20 and a diesel engine 26 drives the pump 24. The stroke limitation discussed above with regard to one of the factors that affects the low-frequency end is related to the relative displacement of the reaction mass 12 with respect to the driven structure 17. The vibratory source 10 also includes a controller 28 configured to control the servovalve 22, and thus, the movement of the reaction mass 12. A displacement of the reaction mass 12 is D. The controller 28 may include, among other components, a filter 30 for filtering signals as discussed later. The controller 28 may be implemented in a computing device as discussed later. A linear variable differential transformer (LVDT) 19 is connected between the reaction mass and driven structure to provide a measure of the relative motion of the reaction mass with respect to the driven structure and is used as a feedback signal to the vibrator control electronics to help maintain centering of the reaction mass within its stroke range.

In this exemplary embodiment, it is discussed how to boost the low-frequency end based on the limitations of the vibratory source. Assume that the vibratory source is well-controlled and that the ground force output of the source matches the pilot signal or that they are related by a known scalar, i.e., the ratio of the peak ground force to the reference peak amplitude. The ground force may be determined by the controller 28 as being approximately a weighted sum of the reaction mass acceleration and baseplate acceleration, where the weighting factor for each acceleration is in direct proportion to the mass of the reaction mass 12 and mass of the driven structure 17.

At low-frequencies, e.g., less than 10-Hz, the reaction mass moves much more than the baseplate. Because the reaction mass' weight is much larger than the weight of the baseplate, at low-frequencies, the reaction mass contributes much more to the weighted sum estimate. In one application, the baseplate's contribution may be ignored.

Thus, to determine the reaction mass displacement D at low frequencies it is possible to double integrate the pilot signal multiplied by a known constant of proportionality. The double integral is necessary as the acceleration of the reaction mass is proportional to the second order time derivative of the displacement D. By performing this double integration, the system is "taken" from the force domain to the displacement domain.

Figure 2:
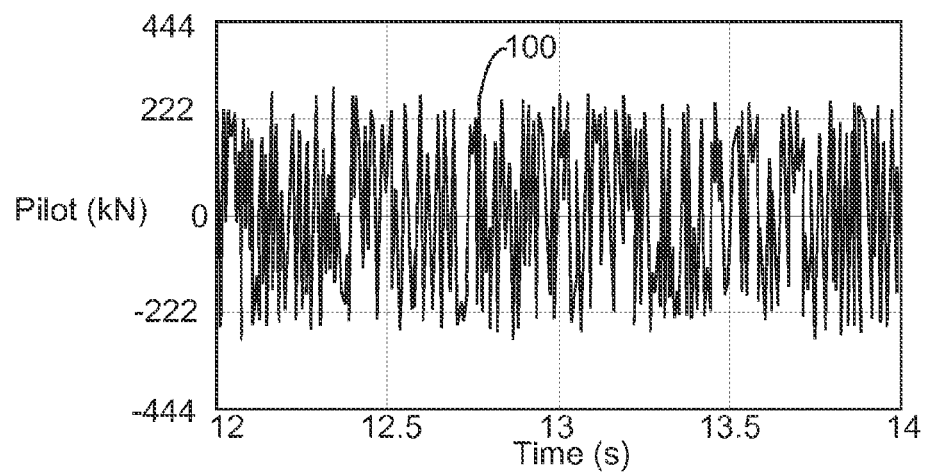
FIG. 2 is a graph illustrating a pilot signal scaled to force and plotted versus time according to an exemplary embodiment.
Figure 3:
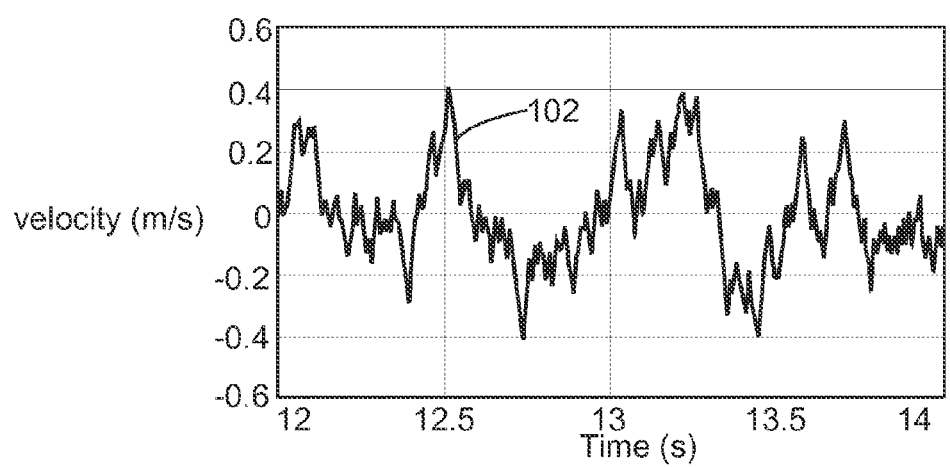
FIG. 3 is a graph illustrating a first temporal integration of the pilot signal of FIG. 2 according to an exemplary embodiment.
Figure 4:
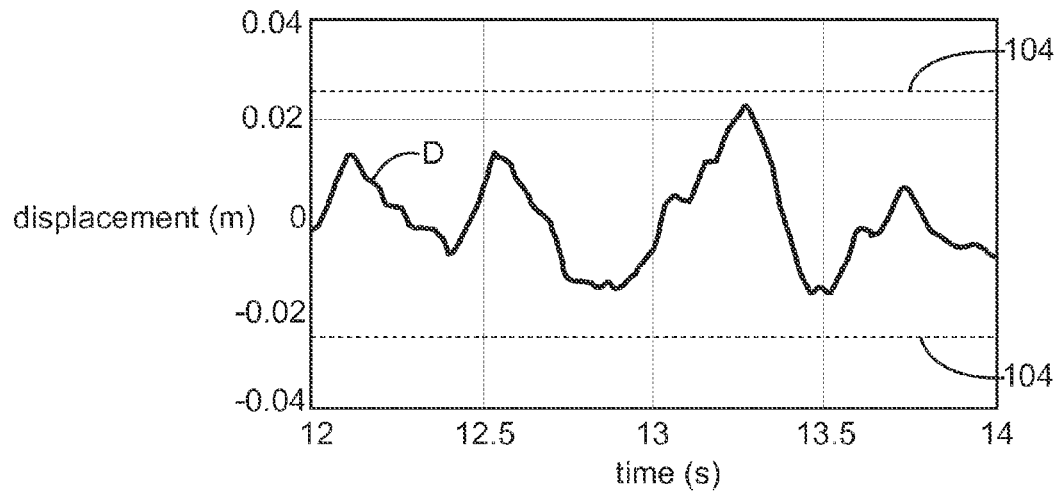
FIG. 4 is a graph illustrating a double time integration of the pilot signal of FIG. 1 according to an exemplary embodiment.
Figure 5:
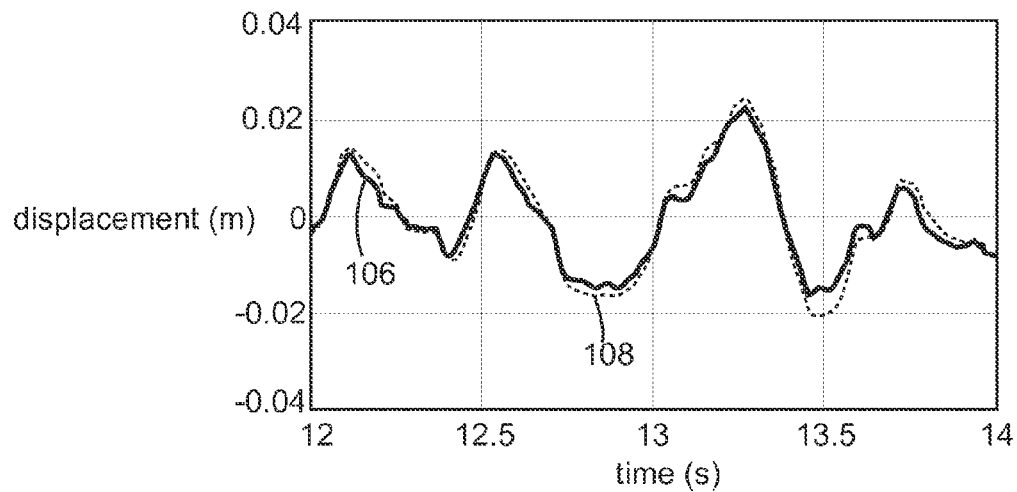
FIG. 5 is a graph illustrating a predicted displacement versus a measured displacement of a reaction mass of a vibratory source according to an exemplary embodiment.

In this regard, FIG. 2 shows a portion of an exemplary pilot signal 100 scaled to force and plotted versus time over a 2 s time interval, FIG. 3 shows a first integration of the pilot signal 100 as corresponding to a velocity 102 of the reaction mass plotted versus time, and FIG. 4 shows the double integration of the pilot signal 100 as corresponding to the displacement D of the reaction mass plotted versus time. FIG. 4 also indicates stroke limits 104 of the reaction mass 12. FIG. 5 illustrates a prediction of the displacement 106 relative to the measured displacement 108. A pure integration operation is marginally stable, i.e., for example, small DC offset errors can lead to large drifts in predicted motion (the DC gain of an pure integrator is infinite), so typically a simple single order low pass filter whose corner frequency (a corner frequency of 0.3 Hz for example) is well below the frequencies of interest is used instead of a pure integration operation.

Being in the displacement domain as illustrated by FIG. 4, a novel level compression or wave-shaping step is applied to the displacement as discussed next. It is noted that '945 applies a wave-shaping function in the force domain to the pilot signal but not in the displacement domain to the displacement as discussed here. Also, it is noted that the exemplary embodiment applies the level compression in the displacement domain in addition to a level compression in the force domain. Thus, the exemplary embodiment applies two level compressions in two different domains.

The level compression applied in the displacement domain, as shown in FIG. 4, has the purpose of taking into account the limitations 104 of the vibratory source. In other words, if the displacement D of the reaction mass approaches or is beyond the stroke limits 104, the level compression modifies the pilot signal to reduce the displacement D below the stroke limits 104. The opposite may be applied if portions of the displacement D in FIG. 4 are far away from the stroke limits 104, i.e., the displacement D may be stretched to get closer to the stroke limits 104.

Figure 6A:
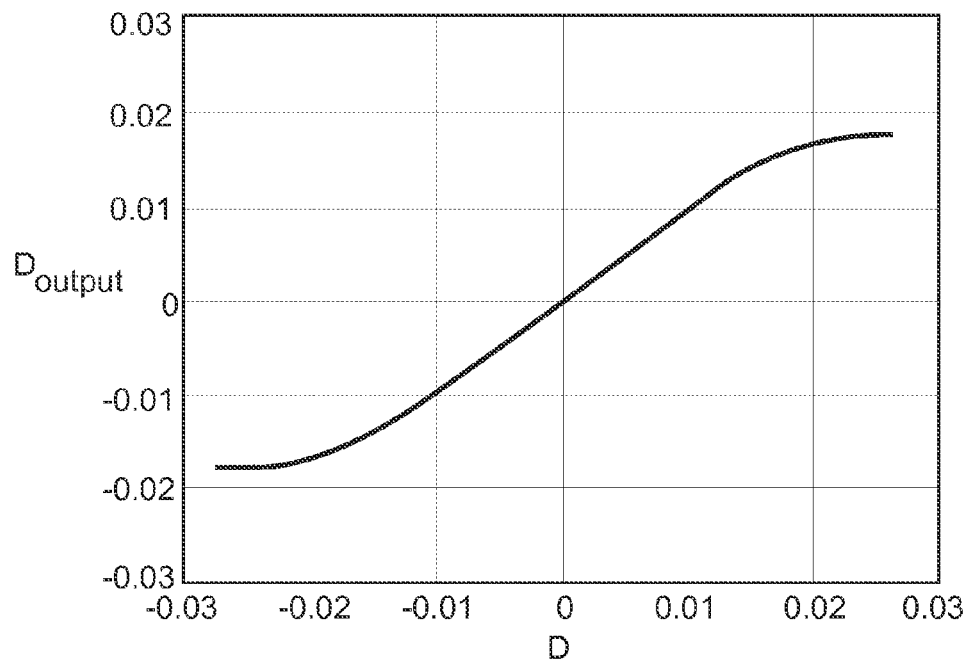
FIGS. 6A-B is a graph illustrating the output of a compression function versus a displacement of a reaction mass of a vibratory source according to an exemplary embodiment.
Figure 6B:
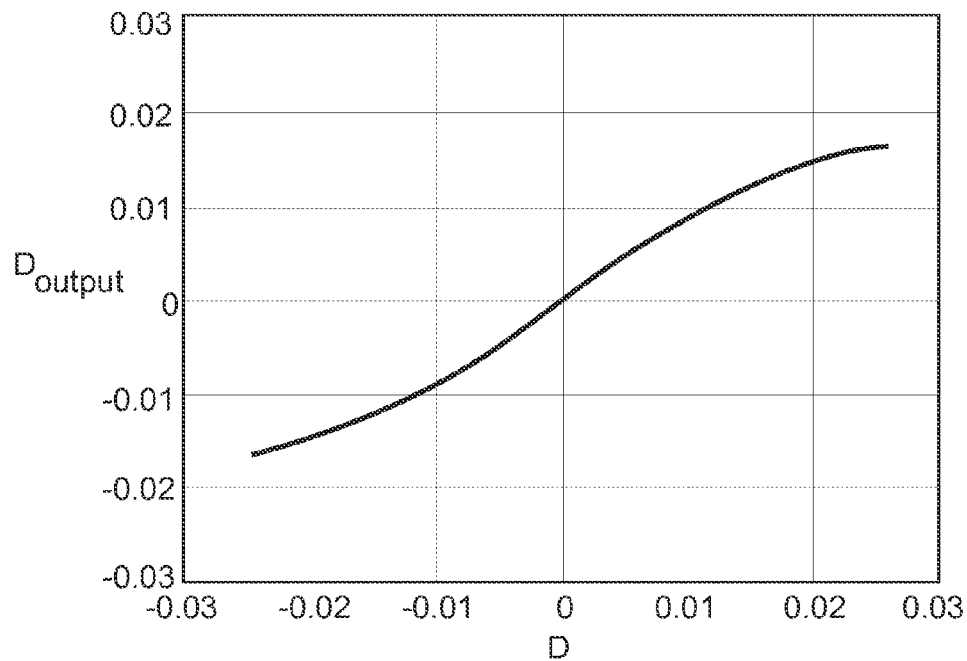

An example of level compression is discussed now with regard to FIGS. 6A-B and 7. Consider that the displacement D illustrated in FIG. 4 is provided as input to a level compression function F. The output of the function F may be $D_{output}$ and a relation between $D_{output}$ and D is illustrated in FIG. 6A. The original displacement D is illustrated in FIG. 7 as a solid line and the output of the level compression function is illustrated by $D_{output}$ in FIG. 6A. The level compression function may be given by $$F(D_i) = \frac{1}{\left[\left(\left|\frac{D_i}{\delta\sigma disp}\right|\right)^{pwr} + 1\right]^{\frac{1}{pwr}}} D_i,$$

where σdisp is the standard deviation of D, δ is a scalar useful for adjusting the output range function and pwr is a coefficient that adjusts the curvature at the extremes of F. In general, larger values of pwr tend to make F look more like a "hard limiter" or clipping function and smaller values make it perform more like a "soft limiter." In this respect, FIG. 6A shows F for δ=2.5 and pwr=6 and FIG. 6B shows F for δ=3 and pwr=2. The compression function used in the '945 is a sine function and that may be used instead for the level compression of the pilot signal in the force domain.

After the level compression process in the displacement domain is completed, the result is transformed back into the force domain by a double differentiation with time. Further steps are performed before obtaining the desired pilot signal. The desired pilot signal is then used to drive the vibratory source to generate the seismic waves.

Figure 9:
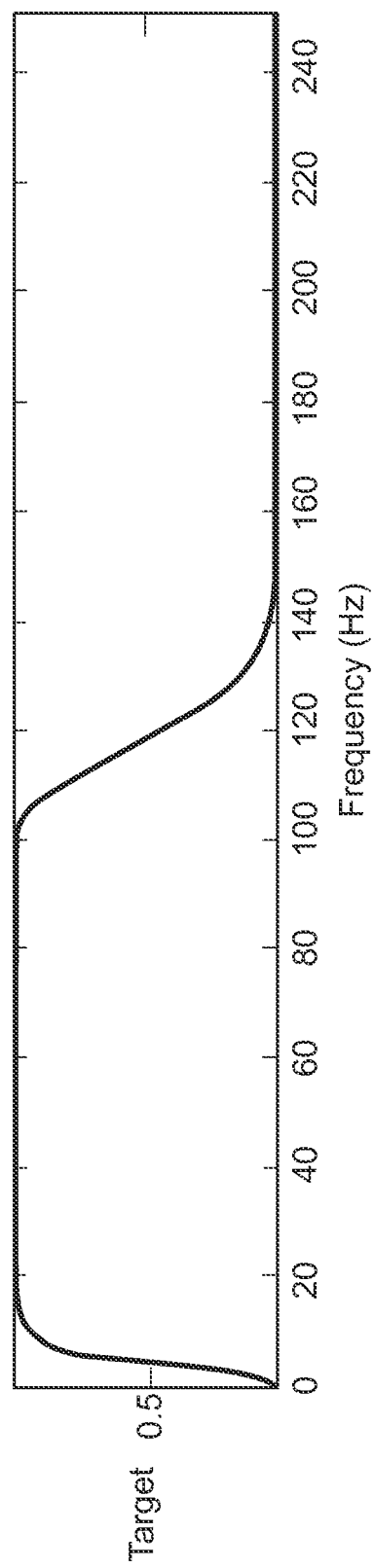
FIG. 9 is a graph illustrating a target spectrum according to an exemplary embodiment.

Some of the above steps are now presented in a flowchart as illustrated in FIG. 8. The method starts with step 800 in which a pilot target amplitude spectrum is defined. Such an amplitude spectrum may be, for example, a flat spectrum as shown in FIG. 9. Then, in step 802, an initial pilot signal is spectrally shaped, for example, as in '945, for matching the pilot target amplitude spectrum. The method may be applied to one or more initial pilot signals. Also, the method is applicable to one or more vibratory sources. The initial pilot signal may be scaled to force and then a level compression scheme is applied in step 804, in the force domain to the scaled pilot signal to obtain a compressed pilot signal. A sine function may be used to implement the level compression scheme.

The compressed pilot signal is then double integrated in step 806 to arrive to a mass displacement in the displacement domain. The mass displacement may be the displacement of the reaction mass 12. Having the mass displacement, the stroke limits of the vibratory source are used for level compression in step 808 to obtain a compressed mass displacement. As illustrated in FIG. 7, the mass displacement is corrected for those values that are beyond the stroke limits. After this, in step 810, the compresses mass displacement is double differentiated in time for returning to the force domain to obtain a modified pilot signal. The modified pilot signal may be level compressed in step 812, in the force domain, to obtain the desired pilot signal. This level compression step is next explained.

For a better understanding of the differences between the level compression in the displacement domain and the level compression in the force domain, FIG. 10 shows the original pilot in the force domain and FIG. 11 shows the effect of the displacement domain compression on pilots in the force domain. By comparing FIGS. 10 and 11, it is noted that picks 120, 122, and 124 in the original pilot signal are reduced in the modified pilot signal (see 120a, 122a and 124a). An expanded view of the differences between the original and modified pilot signal are shown in FIG. 12, in which the solid line indicates the original pilot and the dashed line indicates the modified pilot.

Figure 12:
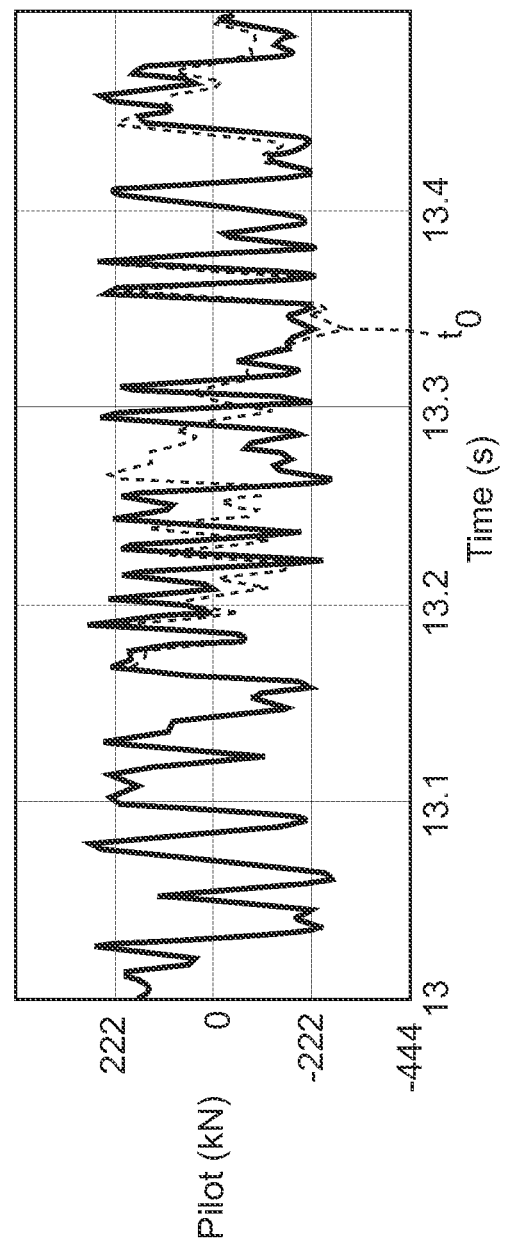
FIG. 12 is a graph illustrating an original pilot signal and a modified pilot signal for boosting the low-frequency content of a vibratory source according to an exemplary embodiment.

FIG. 12 shows that the displacement compression may create some issues in the force domain. Thus, in order to slow the reaction mass down near, for example, the time $t_0$=13.34 s in FIG. 12, a large de-acceleration force is necessary. Therefore, after the displacement is double time differentiated and rescaled back in step 810 to arrive in the force domain, the method performs another step 812 of level compression in the force domain so that the peak force at time $t_0$ is reduced. From here, the method loops back to step 802 until an appropriate pilot signal is obtained. Modifying the pilot signal is an iterative process because when a level compression is applied in one domain it may create issues in another domain. By repeating the process over and over again, the method is able to constrain various factors in multiple domains and still honor the desired target spectrum.

Figure 16:
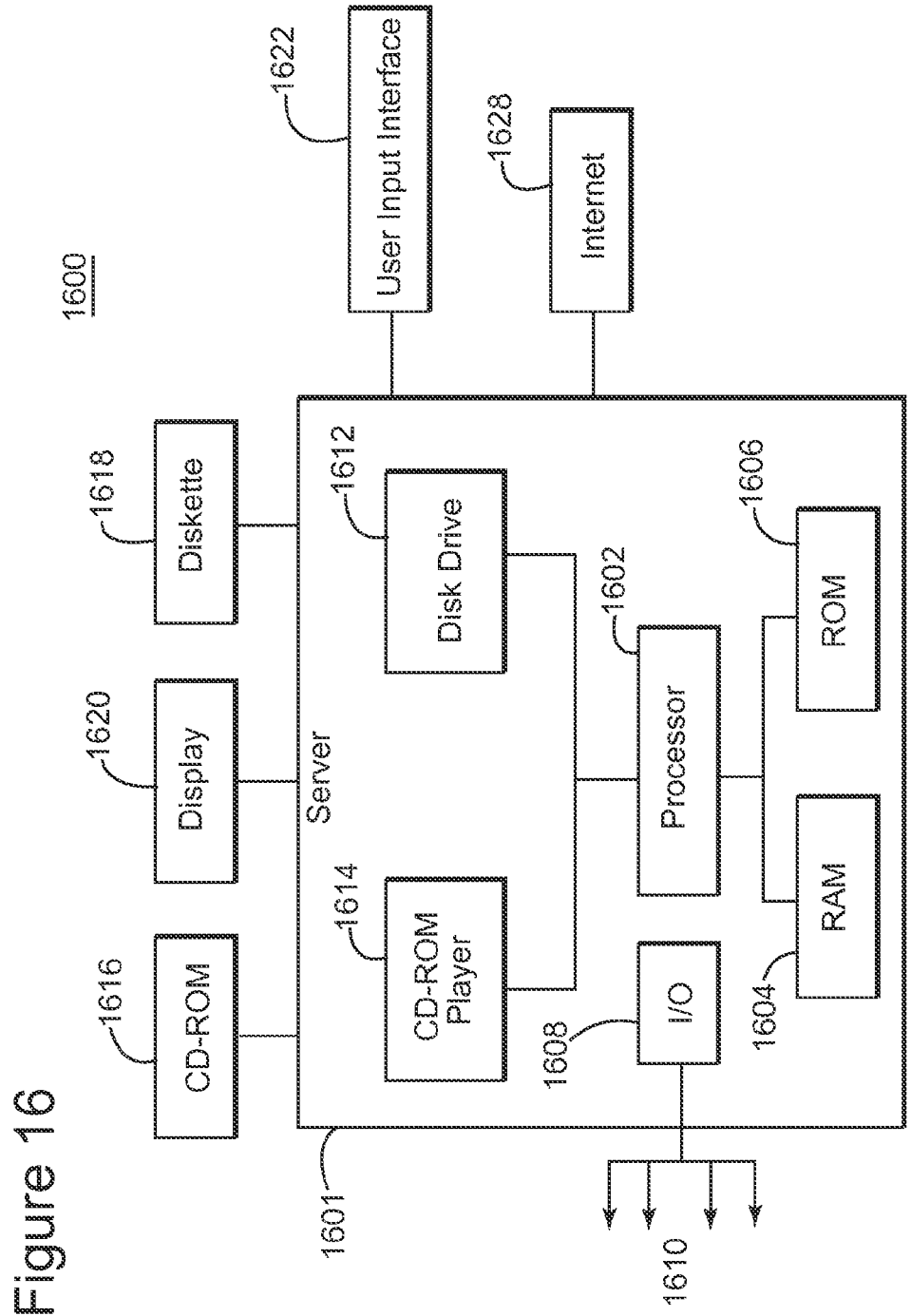
FIG. 16 is a schematic diagram of a computer system suitable for designing pilot sweeps.

The computer program to design and generate the pilot sweeps discussed above can be programmed into a personal computer located either in the office or in the field. FIG. 16 illustrates a computer system that is well suited for this application and will be described later. The pilot sweeps can then be stored on a memory stick or other suitable medium. The resultant pilot sweeps may later be transferred or downloaded and stored in sweep tables that reside in the memory of the controller 28 of the vibratory source 10 or in a central controller memory (not shown) that coordinates plural vibratory sources of the seismic survey. When commanded by either the vibrator operator or the recording truck operator via a telemetry link, the controller executes the selected pilot sweep that is stored in its memory.

Figure 13:
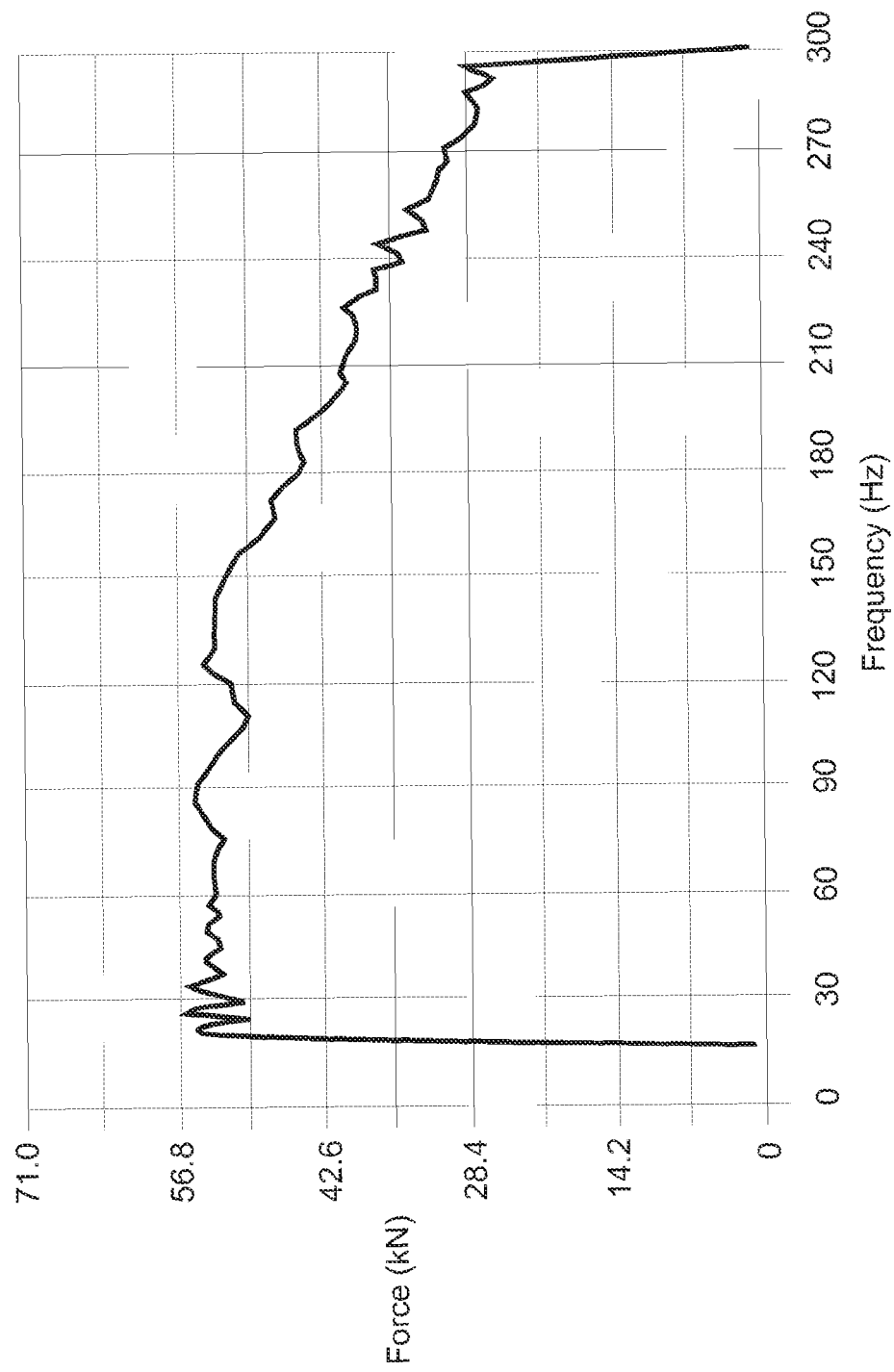
FIG. 13 is a graph showing the high frequency force output limit of a small hydraulic vibrator.

The method discussed with regard FIG. 8 is appropriate when the low-frequency end of the vibratory source needs to be boosted. However, another problem for the traditional sources appears for the high-frequency end. FIG. 13 shows the maximum peak ground force output that can be generated by a small hydraulic vibrator over the range of frequencies that extend up to 300 Hz without exceeding system constraints. Note, for example, the drop in output that can be achieved over the range of 120-300 Hz. The low- and high-frequency ends of a vibratory source depend of the characteristic of the source. In other words, these ranges change from source to source. However, to illustrate the high-frequency boost, it is assumed that the high-frequency end includes frequencies between 150 and 300 Hz.

One noted problem for vibratory sources is that the existing pseudo-random signals tend to overdrive the servo-valve of the vibratory source at high frequencies. In other words, the vibratory hydraulic system has certain limitations that limit the ability of the source to create high temporal peak levels of high frequencies. Thus, according to an exemplary embodiment, there is a method that lowers a peak temporal level of the high-frequency components and compensates for the lower peak by increasing the dwell time at those frequencies. This is achieved by redistributing the high-frequency demand so that lower peak levels are spread out over time. In one application, high levels of high frequencies having short duration is replaced with low levels high frequencies of a longer duration. For a fixed sweep length, this may result in some loss of the low-frequency energy because the low-frequency duration is traded off for high-frequency duration.

The method to be discussed next may be implemented in the controller 28 of the vibratory source 10. In one application, the method may be implemented in a central controller that controls more than one vibratory source. The method is now discussed with regard to FIG. 14.

In a step 1400, a pilot target amplitude spectrum is defined. For example, as shown in FIG. 15A, the pilot target amplitude spectrum may be flat from 10 to 150 Hz and then rising at a rate of 6 dB/octave from 150 to 300 Hz. Of course, other pilot target amplitude spectra may be defined depending on the vibratory source, the depth of the subsurface, etc. In step 1402, an initial pilot signal is generated. The initial pilot signal may include one or more pseudo-random sweeps or other signals that are not pseudo-random.

If the initial includes plural pseudo-random sweeps, a step of sweep decoupling 1404 is applied to reduce cross-correlation between the plural pseudo-random sweeps. However, this step is not necessary if only one pilot signal is used. In step 1406 the pilot signal is filtered to match the target spectrum, e.g., illustrated in FIG. 15A.

For the next step of the method, the initial pilot signal is divided into two or more parts, each part corresponding to a given frequency band. For example, the pilot signal may be divided into a first part corresponding to 0 to 150 Hz, a second part corresponding to 150 to 225 Hz and a third part corresponding to 225 to 300 Hz. In this example, the 225 to 300 Hz is considered to be the high-frequency end of the spectrum. These frequency intervals of the pilot signal may be related to frequency intervals 300, 302, and 304 of a profile of the hydraulic system response of FIG. 13 now replotted in FIG. 15B on a dB scale.

Thus, the initial pilot signal may be band-pass filtered in step 1408 with a filter configured to produce shapes 300a, 302a and 304a as shown in FIGS. 15C-E. If the initial pilot signal includes plural pseudo-random sweeps, each one is filtered as shown in FIGS. 15C-E. The spectral shape of each filter 300a, 302a and 304a is in one application complimentary in shape to the constraint (300, 302, and 304) imposed by the hydraulic system (e.g., servo-valve). For example, if it is known that for a vibratory source the servo-valve response drops off by 6 dB when sweeping from 150 Hz up to 225 Hz, the complimentary filter spectrum rises 6 dB over that same frequency interval.

In step 1410, band-passed parts of the initial pilot signal are level compressed, for example, with a sine function as described in '945. In step 1412, the three (more or less parts of the initial pilot signal for other situations) parts of the initial pilot signal are recombined to create a recombined pilot signal that covers the desired frequency range, e.g., 10 to 300 Hz in FIG. 15A. However, it is noted that the recombination step may introduce unwanted frequencies or may modify in an unwanted way the existing frequencies. Also, the transition regions where two parts are joined together may not be smooth.

Thus, in step 1414 a de-emphasis spectral correction is applied to the recombined pilot signal (to each combined sweep if the recombined pilot signal includes plural sweeps). An example of a de-emphasis filter configuration is shown in FIG. 15F. The de-emphasis filter may have a shape that corrects for the changes made in step 1408. In step 1416 the output of the step 1414 is filtered to match the target spectrum and fill in gaps in the transition regions between the recombined parts of the pilot signal.

Another stage of wave-shaping/level compression may be applied in the force domain in step 1418 and in step 1420 a low-pass filter may be applied to remove any spectral content introduced by level compression that falls above the highest desired frequency and to obtain the desired pilot signal. These last steps are optional. In one application, steps 1404 to 1420 may be repeated one or more times to better shape (decouple if plural sweeps are used) the desired pilot signal.

An example of a representative computer system capable of carrying out operations in accordance with the exemplary embodiments discussed above is illustrated in FIG. 16. Hardware, firmware, software or a combination thereof may be used to perform the various steps and operations described herein.

The exemplary computer system 1600 suitable for performing the activities described in the exemplary embodiments may include server 1601. Such a server 1601 may include a central processor unit (CPU) 1602 coupled to a random access memory (RAM) 1604 and to a read-only memory (ROM) 1606. The ROM 1606 may also be other types of storage media to store programs, such as programmable ROM (PROM), erasable PROM (EPROM), etc. The processor 1602 may communicate with other internal and external components through input/output (I/O) circuitry 1608 and bussing 1610, to provide control signals and the like. For example, the processor 1602 may communicate with sensors, an actuator system and/or a filter of the vibratory source. The processor 1602 carries out a variety of functions as is known in the art, as dictated by software and/or firmware instructions.

The server 1601 may also include one or more data storage devices, including hard disk drives 1612, CD-ROM drives 1614, and other hardware capable of reading and/or storing information such as a DVD, etc. In one embodiment, software for carrying out the above discussed steps may be stored and distributed on a CD-ROM or DVD 1616, removable media 1618 or other form of media capable of portably storing information. These storage media may be inserted into, and read by, devices such as the CD-ROM drive 1614, the drive 1612, etc. The server 1601 may be coupled to a display 1620, which may be any type of known display or presentation screen, such as LCD or LED displays, plasma displays, cathode ray tubes (CRT), etc. A user input interface 1622 is provided, including one or more user interface mechanisms such as a mouse, keyboard, microphone, touch pad, touch screen, voice-recognition system, etc.

The server 1601 may be coupled to other computing devices via a network. The server may be part of a larger network configuration as in a global area network (GAN) such as the Internet 1628.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile discs (DVD), optical storage devices, or magnetic storage devices such a floppy disk or magnetic tape. Other non-limiting examples of computer readable media include flash-type memories or other known types of memories.

The server 1601 of the computer device 1600 may be configured to specifically execute the following methods. In one exemplary embodiment illustrated in FIG. 17, there is a method for generating a desired pilot signal for driving a vibratory source to generate seismic waves. The method includes a step 1700 of selecting a pilot target amplitude spectrum for the vibratory source; a step 1702 of determining an initial pilot signal that matches the pilot target amplitude spectrum; a step 1704 of scaling the initial pilot signal to a force to be applied by the vibratory source to the ground, wherein the scaled pilot signal is in a force domain; a step 1706 of level compressing the scaled pilot signal in the force domain to obtain a compressed pilot signal; a step 1708 of determining a mass displacement associated with the vibratory source based on the compressed pilot signal; a step 1710 of level compressing the mass displacement in a displacement domain to obtain a compressed mass displacement; and a step 1712 of transforming the compressed mass displacement back to the force domain to obtain a modified pilot signal. The level compressing of the mass displacement takes into account stroke limits of the vibratory source, and the modified pilot signal boosts a low-frequency end of a range of the vibratory source comparative to the initial pilot signal.

The same server may be used to implement a method for generating a desired pilot signal for driving a vibratory source to generate seismic waves. The method, illustrated in FIG. 18, includes a step 1800 of selecting a pilot target amplitude spectrum for the vibratory source; a step 1802 of determining an initial pilot signal that matches the pilot target amplitude spectrum; a step 1804 of associating the initial pilot signal with at first and second frequency bands, the second frequency band including a high-frequency end of a range of the vibratory source; a step 1806 of selecting a first band-pass configuration for the first frequency band and a second band-pass configuration for the second frequency band; a step 1808 of band-passing a first part of the initial pilot signal associated with the first frequency band with the first band-pass configuration; a step 1810 of band-passing a second part of the initial pilot signal associated with the second frequency band with the second band-pass configuration; a step 1812 of level compressing the first and second parts of the initial pilot signal; a step 1814 of recombining the first and second parts of the initial pilot signal to form a recombined pilot signal; and a step 1816 of processing the recombined pilot signal to obtain the desired pilot signal. The desired pilot signal boosts the high-frequency end of the range of the vibratory source comparative to the initial pilot signal.

Figure 19A:
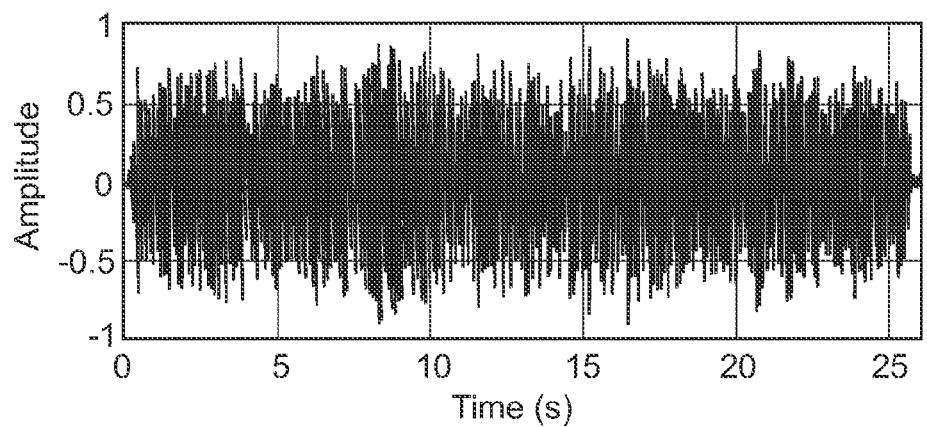
FIGS. 19A-B illustrated bandpass filtered comparison of pilot signal before and after high frequency level compression process; and, FIG. 20 illustrates pilot amplitude spectrum with high frequency boost after high frequency level compression.
Figure 19B:
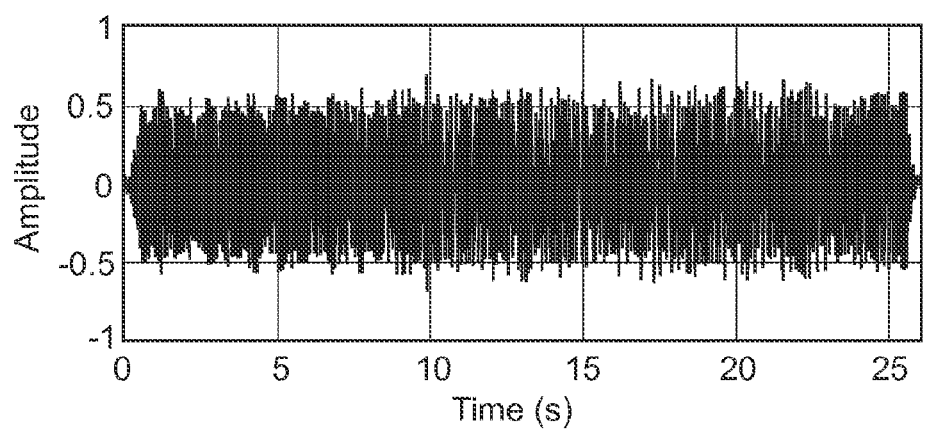

FIGS. 19A-B compare the pilot signal before and after application of the high frequency boost with level compression. Both graphs shown in FIGS. 19A and B have been band-pass filtered over the frequency band of 175-225 Hz. FIG. 19A shows the pilot signal in its first pass through the process after step 1406 or 1802. Note the high peaks in the waveform of FIG. 19A as well as intervals where energy is low. FIG. 19B shows the band-pass filtered pilot signal waveform after the completion of the iterative process described in FIG. 14 or 18. Note that after the high frequency boost with level compression process has been completed, the peaks have been reduced while there are fewer intervals of time with low energy.

Figure 14:
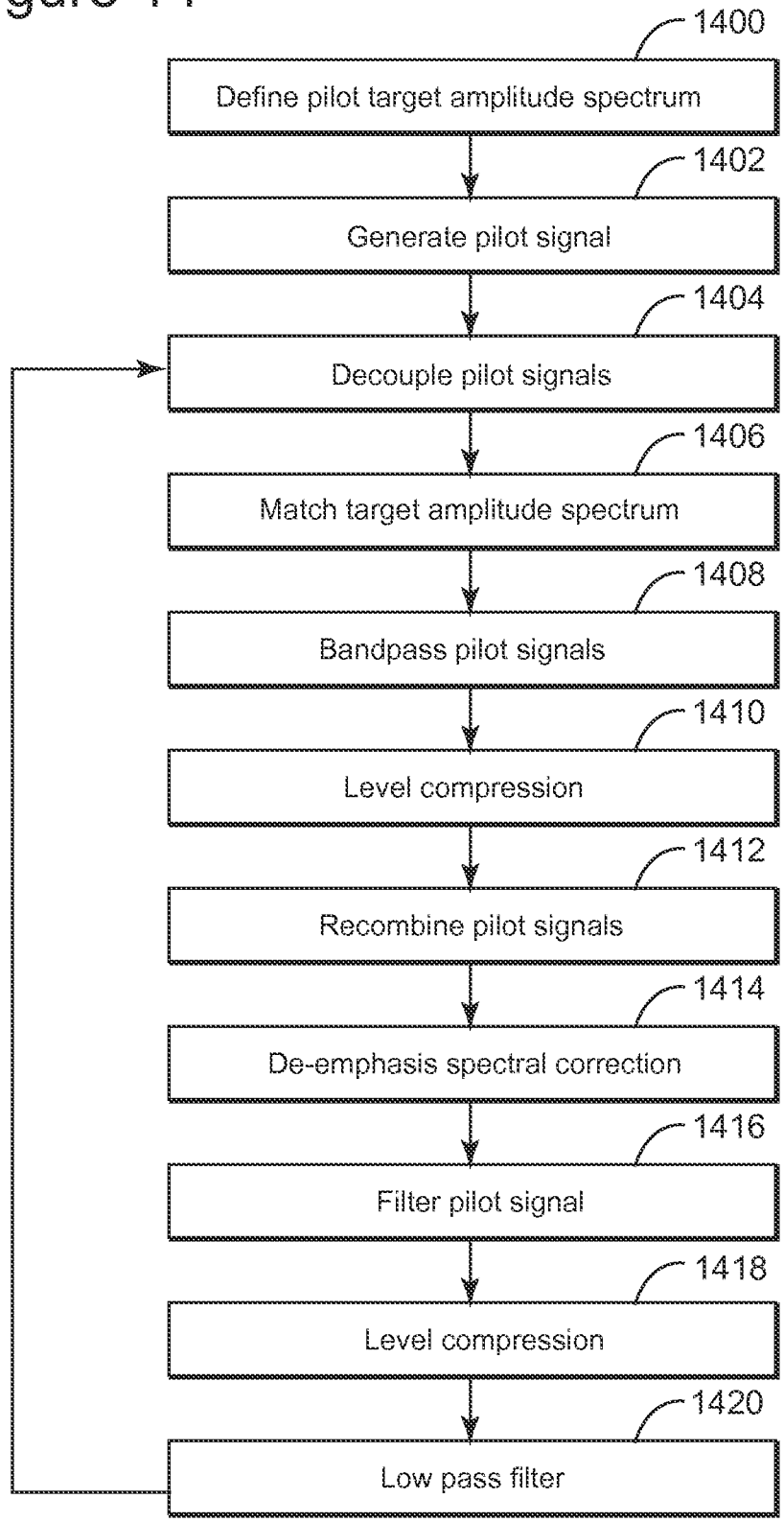
FIG. 14 is a flowchart of a method for boosting the high-frequency content of a vibratory source according to an exemplary embodiment.
Figure 20:
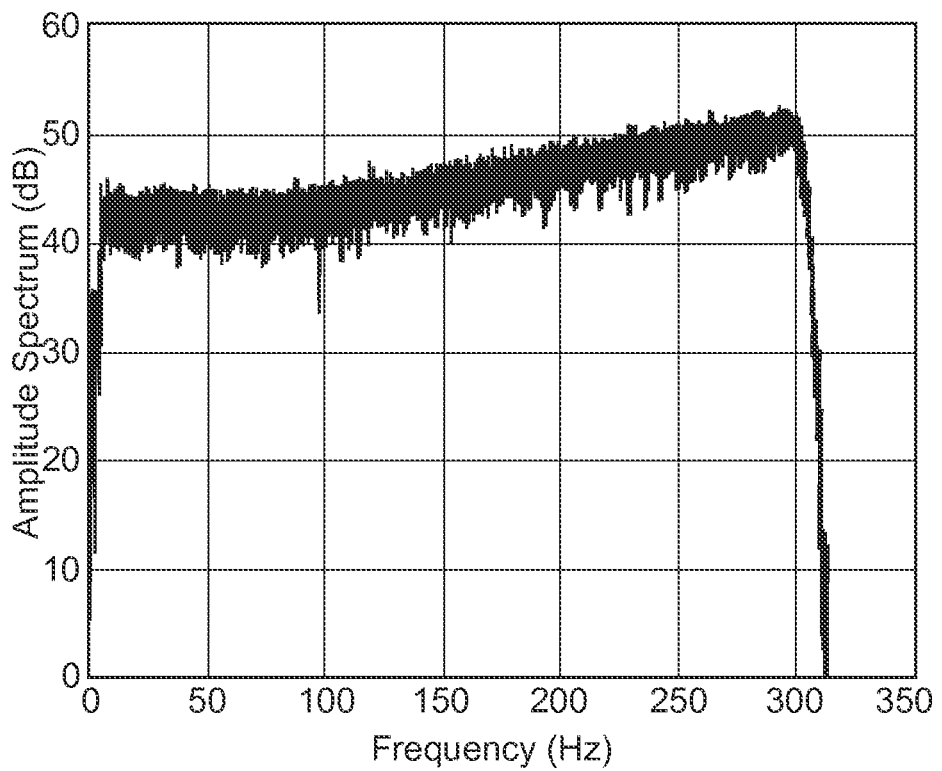

Referring now to FIG. 20, it shows a graph of the amplitude of the high frequency boosted pilot after the process illustrated in either FIG. 14 or 18 is completed. The amplitude versus frequency plot is displayed on a dB scale. The shape of the graph follows the target spectrum illustrated in FIG. 15A, but in this case a target spectrum was used where the 6 dB/octave boost begins at 100 Hz rather than at 150 Hz.

As before for the low-frequency boost, the pilot sweeps for the high-frequency boost can be downloaded onto a suitable memory medium and downloaded in the field into the memory of the vibrator controller where it is stored in a part of memory designated as a sweep table. Upon command by either the vibrator operator or by the recording truck recording system operator via telemetry, the vibrator executes the selected pilot sweep stored in its sweep table to provide a reference signal for the controller to follow so that a useful ground force signal is produced by the hydraulic system thereby imparting the seismic energy into the ground having the desired spectral content.

The disclosed exemplary embodiments provide a vibratory source and a method that boosts high- and/or low-frequency content. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for generating with a computing device a desired pilot signal for driving a vibratory source to generate seismic waves, the method comprising:

selecting a pilot target amplitude spectrum for the vibratory source;

determining an initial pilot signal that matches the pilot target amplitude spectrum;

scaling the initial pilot signal to a force to be applied by the vibratory source to the ground, wherein the scaled pilot signal is in a force domain;

level compressing the scaled pilot signal in the force domain to obtain a compressed pilot signal;

determining a mass displacement associated with the vibratory source based on the compressed pilot signal;

level compressing the mass displacement in a displacement domain to obtain a compressed mass displacement; and transforming the compressed mass displacement back to the force domain to obtain a modified pilot signal, wherein the level compressing of the mass displacement takes into account stroke limits of the vibratory source, the modified pilot signal boosts a low-frequency end of the vibratory source comparative to the initial pilot signal, the level compression in the force domain uses a first function and the level compression in the displacement domain uses a second function, and the first function is a sine function and the second function is $$F(D_i) = \frac{1}{\left[\left(\left|\frac{D_i}{\delta\sigma disp}\right|\right)^{pwr} + 1\right]^{\frac{1}{pwr}}} D_i,$$

where $D_i$ is a displacement, $\sigma disp$ is a standard deviation of $D_i$, $\delta$ is a scalar related to an output of the second function F and pwr is a coefficient related to a curvature at extremes of second function F.

2. The method of claim 1, wherein the step of determining a mass displacement comprises:
   double integrating over time the compressed pilot signal to obtain the mass displacement associated with the vibratory source.

3. The method of claim 1, wherein the step of transforming the compressed mass displacement comprises:
   double differentiating with time the compressed mass displacement to obtain the modified pilot signal.

4. The method of claim 1, further comprising:
   level compressing the modified pilot signal to obtain the desired pilot signal.

5. The method of claim 4, further comprising:
   driving the vibratory source with the desired pilot signal to generate the seismic waves.

6. The method of claim 1, wherein the initial pilot signal includes plural initial pilot signals.

7. The method of claim 6, wherein the initial pilot signal includes one or more pseudo-random signals.

8. The method of claim 1, further comprising:
   spectrally shaping the pilot signal to match the pilot target amplitude spectrum.

9. A computer for generating a desired pilot signal suitable for driving a vibratory source to generate seismic waves, the computer comprising:
   an interface configured to receive a pilot target amplitude spectrum for the vibratory source; and
   a processor connected to the interface and configured to,
      determine an initial pilot signal that matches the pilot target amplitude spectrum,
      scale the pilot signal to a force to be applied by the vibratory source to ground, wherein the scaled pilot signal is in a force domain,
      level compress the scaled pilot signal in the force domain to obtain a compressed pilot signal,
      determine a mass displacement associated with the vibratory source based on the compressed pilot signal,
      level compress the mass displacement in a displacement domain to obtain a compressed mass displacement, and
      transform the compressed mass displacement back to the force domain to obtain a modified pilot signal,
   wherein the level compressing of the mass displacement takes into account stroke limits of the vibratory source,
   the modified pilot signal boosts a low-frequency end of the vibratory source comparative to the initial pilot signal,
   the level compression in the force domain uses a first function and the level compression in the displacement domain uses a second function, and
   the first function is a sine function and the second function is $$F(D_i) = \frac{1}{\left[\left(\left|\frac{D_i}{\delta\sigma disp}\right|\right)^{pwr} + 1\right]^{\frac{1}{pwr}}} D_i,$$

where $D_i$ is a displacement, $\sigma disp$ is a standard deviation of $D_i$, $\delta$ is a scalar related to an output of the second function F and pwr is a coefficient related to a curvature at extremes of second function F.

10. The computer of claim 9, wherein the processor is further configured to:
   double integrate over time the compressed pilot signal to obtain the mass displacement associated with the vibratory source.

11. The computer of claim 9, wherein the processor is further configured to:
   double differentiate with time the compressed mass displacement to obtain the modified pilot signal.

12. The computer of claim 9, wherein the processor is further configured to:
   level compress the modified pilot signal to obtain the desired pilot signal.

13. The computer of claim 12, wherein the processor is further configured to:
   drive the vibratory source with the desired pilot signal to generate the seismic waves.

14. The computer of claim 9, wherein the initial pilot signal includes plural initial pilot signals.

15. The computer of claim 14, wherein the initial pilot signal includes one or more pseudo-random signals.

16. A non-transitory computer readable medium including computer executable instructions, wherein the instructions, when executed by a processor, implement instructions for:
   selecting a pilot target amplitude spectrum for the vibratory source;
   determining an initial pilot signal that matches the pilot target amplitude spectrum;
   scaling the pilot signal to a force to be applied by the vibratory source to ground,
   wherein the scaled pilot signal is in a force domain;
   level compressing the scaled pilot signal in the force domain to obtain a compressed pilot signal;
   determining a mass displacement associated with the vibratory source based on the compressed pilot signal;
   level compressing the mass displacement in a displacement domain to obtain a compressed mass displacement;
   transforming the compressed mass displacement back to the force domain to obtain a modified pilot signal;
   level compressing the modified pilot signal to obtain the desired pilot signal; and
   driving the vibratory source with the desired pilot signal to generate the seismic waves,
   wherein the level compressing of the mass displacement takes into account stroke limits of the vibratory source,
   the modified pilot signal boosts a low-frequency end of a range of the vibratory source comparative to the initial pilot signal,
   the level compression in the force domain uses a first function and the level compression in the displacement domain uses a second function, and
   the first function is a sine function and the second function is $$F(D_i) = \frac{1}{\left[\left(\left|\frac{D_i}{\delta\sigma disp}\right|\right)^{pwr} + 1\right]^{\frac{1}{pwr}}} D_i,$$

where $D_i$ is a displacement, σdisp is a standard deviation of $D_i$, σ is a scale related to an output of the second function F and pwr is a coefficient related to a curvature at extremes of second function F.

* * * * *